US009547696B2

(12) United States Patent
Seth et al.

(10) Patent No.: US 9,547,696 B2
(45) Date of Patent: *Jan. 17, 2017

(54) RANKING CONTENT USING LOCATION-BASED QUERY LOG ANALYSIS

(71) Applicant: GOOGLE INC., Mountain View, CA (US)

(72) Inventors: Rohan Seth, San Francisco, CA (US); Shumeet Baluja, Leesburg, VA (US); Michael Jesse Chu, Los Altos Hills, CA (US); Joshua J. Sacks, San Carlos, CA (US); David Marwood, San Francisco, CA (US); Michele Covell, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,825

(22) Filed: Sep. 4, 2015

(65) Prior Publication Data

US 2015/0379017 A1    Dec. 31, 2015

Related U.S. Application Data

(63) Continuation of application No. 13/111,485, filed on May 19, 2011, now Pat. No. 9,129,029.

(51) Int. Cl.
*G06F 17/30* (2006.01)

(52) U.S. Cl.
CPC ....... *G06F 17/3053* (2013.01); *G06F 17/3087* (2013.01); *G06F 17/30241* (2013.01); *G06F 17/30528* (2013.01); *G06F 17/30554* (2013.01)

(58) Field of Classification Search
CPC .............. G06F 17/3024; G06F 17/3087; G06F 17/30241; G06F 17/3053; G06F 17/30528; G06F 17/30554
USPC ............... 707/724, 725, 732, 748, 750, 751, 707,707/728
See application file for complete search history.

(56) References Cited

U.S. PATENT DOCUMENTS

| | | |
|---|---|---|
| 7,562,068 B2 | 7/2009 | Naam |
| 7,873,904 B2 | 1/2011 | Wang et al. |
| 7,945,546 B2 | 5/2011 | Bliss et al. |
| 7,974,974 B2 | 7/2011 | Tankovich et al. |
| 8,306,973 B2 | 11/2012 | Ohazama et al. |

(Continued)

OTHER PUBLICATIONS

Office Action issued in U.S. Appl. No. 13/111,485 dated Feb. 1, 2013.

(Continued)

*Primary Examiner* — Vincent Boccio
(74) *Attorney, Agent, or Firm* — Marshall, Gerstein & Borun LLP (57) ABSTRACT

Methods, systems, and apparatus, including computer programs encoded on a computer-readable storage medium, including a method for ranking content using location-based query log analysis. The method comprises: identifying a region defining an area of interest including identifying a plurality of content items that are associated with the region; evaluating query logs associated with users that submitted queries associated with the region to determine a ranking associated with the plurality of content items; receiving a request for content associated with the region; and providing one or more of the content items based at least in part on the ranking.

18 Claims, 5 Drawing Sheets

(56) References Cited

U.S. PATENT DOCUMENTS

| | | | |
|---|---|---|---|
| 8,346,751 B1* | 1/2013 | Jin | G06F 17/30241 |
| | | | 707/708 |
| 8,484,198 B1 | 7/2013 | Seth et al. | |
| 9,129,029 B1 | 9/2015 | Seth et al. | |
| 2006/0069504 A1 | 3/2006 | Bradley et al. | |
| 2006/0101005 A1* | 5/2006 | Yang | G06F 17/3087 |
| | | | 707/999.003 |
| 2007/0255552 A1* | 11/2007 | Thiesson | G06F 17/30867 |
| | | | 704/8 |
| 2008/0082578 A1* | 4/2008 | Hogue | G06F 17/30864 |
| | | | 707/999.107 |
| 2008/0154877 A1 | 6/2008 | Joshi et al. | |
| 2008/0256444 A1 | 10/2008 | Wang et al. | |
| 2009/0254840 A1* | 10/2009 | Churchill | G06F 3/0481 |
| | | | 715/753 |
| 2010/0211909 A1 | 8/2010 | Ghanekar et al. | |
| 2010/0287178 A1 | 11/2010 | Lambert et al. | |
| 2012/0123904 A1* | 5/2012 | Foerster | G06Q 30/0625 |
| | | | 705/26.62 |
| 2012/0166432 A1* | 6/2012 | Tseng | G06F 17/30867 |
| | | | 707/728 |

OTHER PUBLICATIONS

Office Action issued in U.S. Appl. No. 13/111,485 dated Aug. 26, 2013.
Office Action issued in U.S. Appl. No. 13/111,485 dated Jul. 31, 2014.
Office Action issued in U.S. Appl. No. 13/111,485 dated Jan. 30, 2015.

* cited by examiner

RANKING CONTENT USING LOCATION-BASED QUERY LOG ANALYSIS

CROSS-REFERENCE TO RELATED APPLICATIONS

This application is a continuation of and claims priority to U.S. application Ser. No. 13/111,485, filed on May 19, 2011, entitled "Ranking Content Using Location-Based Query Log Analysis," the entire disclosure of which is hereby expressly incorporated by reference herein.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for ranking content using location-based query log analysis. The method comprises: identifying a region defining an area of interest including identifying a plurality of content items that are associated with the region; evaluating query logs associated with users that submitted queries associated with the region to determine a ranking associated with the plurality of content items; receiving a request for content associated with the region; and providing one or more of the content items based at least in part on the ranking.

These and other implementations can each optionally include one or more of the following features. The content items can include one or more advertisements. Evaluating query logs can include evaluating query log data, where each entry in a query log includes query terms submitted, a region as defined by a bounding region that was displayed in a viewport to the user prior to receipt of the query, and where evaluating query log data includes evaluating one or more business listings associated with the bounding region shown in the viewport. The plurality of content items can comprise business listings. The method can further comprise determining a number of business listings associated with the region, and where evaluating query logs includes evaluating the business listings using the query terms from the query log to rank the business listings.

In general, another innovative aspect of the subject matter described in this specification can be implemented in a method comprising: receiving a request from a user to display a region of interest in a viewport on a display of a client device; receiving a first query from the user while the region is displayed in the viewport including receiving one or more query terms; determining one or more first content items associated with the region and the query terms and ranking the first content items based at least in part on the received query terms; providing first query results to the user based at least in part on the ranking; storing, in a query log, an entry that includes the query terms and information describing the region displayed in the viewport; subsequently, receiving a second query from or about the region; identifying one or more second content items associated with the region; evaluating the query log including using the query terms included in the query log to rank the one or more second content items; and responsive to the subsequently received second query, providing second query results based at least in part on the ranking of the one or more second content items.

These and other implementations can each optionally include one or more of the following features. The one or more first content items and the one or more second content items can include one or more advertisements. The one or more first content items and the one or more second content items can be business listings.

In general, another innovative aspect of the subject matter described in this specification can be implemented in a method comprising: receiving a request from a user to display a region of interest in a viewport on a display of a client device; receiving a first query from the user while the region is displayed in the viewport including receiving one or more query terms; determining one or more first content items associated with the region and the first query and ranking the first content items based at least in part on the received query terms; providing first query results to the user based at least in part on the ranking where providing the first query results includes providing one or more pushpin features as additions to the region of interest shown in the viewport; storing, in a query log, an entry that includes the query terms, and information describing the region displayed in the viewport; subsequently, receiving a second query from or about the region; identifying one or more second content items associated with the region; evaluating the query log including using the query terms included in the query log to rank the one or more second content items; and responsive to the subsequently received second query, providing second query results based at least in part on the ranking of the one or more second content items.

These and other implementations can each optionally include one or more of the following features. The one or more first content items and the one or more second content items can include one or more advertisements. Providing first query results can further include providing a viewport displaying the region and providing one or more pushpin features as additions to the region shown on the viewport based at least in part on the ranking of the one or more first content items.

In general, another innovative aspect of the subject matter described in this specification can be implemented in a method comprising: providing a viewport displaying a region; providing one or more pushpin features as additions to the region shown on the viewport; receiving a first query from the user while the region is displayed in the viewport including receiving one or more query terms; determining one or more first content items associated with the region and the first query and ranking the first content items based at least in part on the received query terms and the one or more pushpin features; providing first query results to the user based at least in part on the ranking; storing, in a query log, an entry that includes the query terms, and information describing the region displayed in the viewport and the one or more pushpin features; subsequently, receiving a second query from or about the region; identifying one or more second content items associated with the region using the entry including ranking the one or more second content items; and responsive to the subsequently received second query, providing second query results based at least in part on the ranking of the one or more second content items.

These and other implementations can each optionally include one or more of the following features. The one or more first content items and the one or more second content items can include one or more advertisements.

In general, another innovative aspect of the subject matter described in this specification can be implemented in a method comprising: identifying a region defining an area of interest including identifying a plurality of queries that are associated with the region, the queries being queries previously received and processed for delivery of content items to users in or having expressed an interest in the region; evaluating query logs associated with users that submitted the queries associated with the region to determine a ranking associated with the queries; receiving a request for content associated with the region; identifying one or more content items responsive to the request; ranking the identified one or more content items based at least in part on the ranking associated with the queries; and providing one or more of the content items based at least in part on the ranking.

In general, another innovative aspect of the subject matter described in this specification can be implemented in a system comprising: a content management system that provides content items responsive to received requests, the content management system including a query handler and a location based ranking module; where the query handler is enabled to receive queries and location information and store the queries in association with the location information; and where the location based ranking module is enabled to rank content items that are responsive to receive requests based at least in part on the queries that are stored.

In general, another innovative aspect of the subject matter described in this specification can be implemented in a computer program product tangibly embodied in a computer-readable storage medium and comprising instructions that when executed by a processor perform steps comprising: identifying a region defining an area of interest including identifying a plurality of content items that are associated with the region; evaluating query logs associated with users that submitted queries associated with the region to determine a ranking associated with the plurality of content items; receiving a request for content associated with the region; and providing one or more of the content items based at least in part on the ranking.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, processes and systems for ranking content based, at in least in part, on location-based query log analysis. In some implementations, content can be ranked and served based on information evaluated from query logs. For example, the query logs can identify queries associated with geographic areas and the content items (e.g., business listings) that were provided in response to the queries. In some implementations, analysis of the queries can provide information about what is of general (e.g., a user-population averaged) interest over time for a geographic area. In some implementations, the information can be used to rank served content in an order corresponding to user-population-averaged interest.

In some implementations, the location data associated with the queries can be derived from any of various sources, including GPS-derived readings from mobile devices, location mapping based on visible WiFi SSIDs, the viewport of an associated map-related application, or location mapping based on the IP address of the user's device (e.g., by reverse IP look-up). By evaluating query log data for queries that include associated location information, population-averaged statistics can be determined regarding what query terms or what query content (e.g., content that is delivered response to a query request) occur in association with a given location. In some implementations, the statistics can be used to rank and serve content in response to queries or requests for content in or related to the given location.

Some implementations can identify a strongest correlation between a query term and a location when, for example, the user location (e.g., based on GPS, WiFi, or an IP address) is in the same area as the viewing location (e.g., associated with a map-related application). For example, in those situations, not only is the user viewing the inferred area, but the user is also actually physically present in that same area, which can strengthen the importance of the location aspect of the user's query. In some implementations, the strength of the correlation of a content sponsor's content to a specific location can affect the amount that the content sponsor is willing to bid in an auction for the opportunity to present their content.

In some implementations, statistics for associations between query terms and locations can be used to infer what content (e.g., ads, business listings, web sites for local attractions, etc.) are likely to be of the most interest to someone looking at a map. In some implementations, the statistics can be used to re-rank lists associated with that map that must be truncated before display. For example, if there are too many businesses to effectively mark within some urban map area, the number of businesses can be reduced based on what is most commonly searched for in association with that location. For example, a bicycle rental business may have a proportionally higher number of associated queries from users in the San Francisco Marina District, while taxi/shuttle companies may have more associated queries from the airport region.

Figure 1:
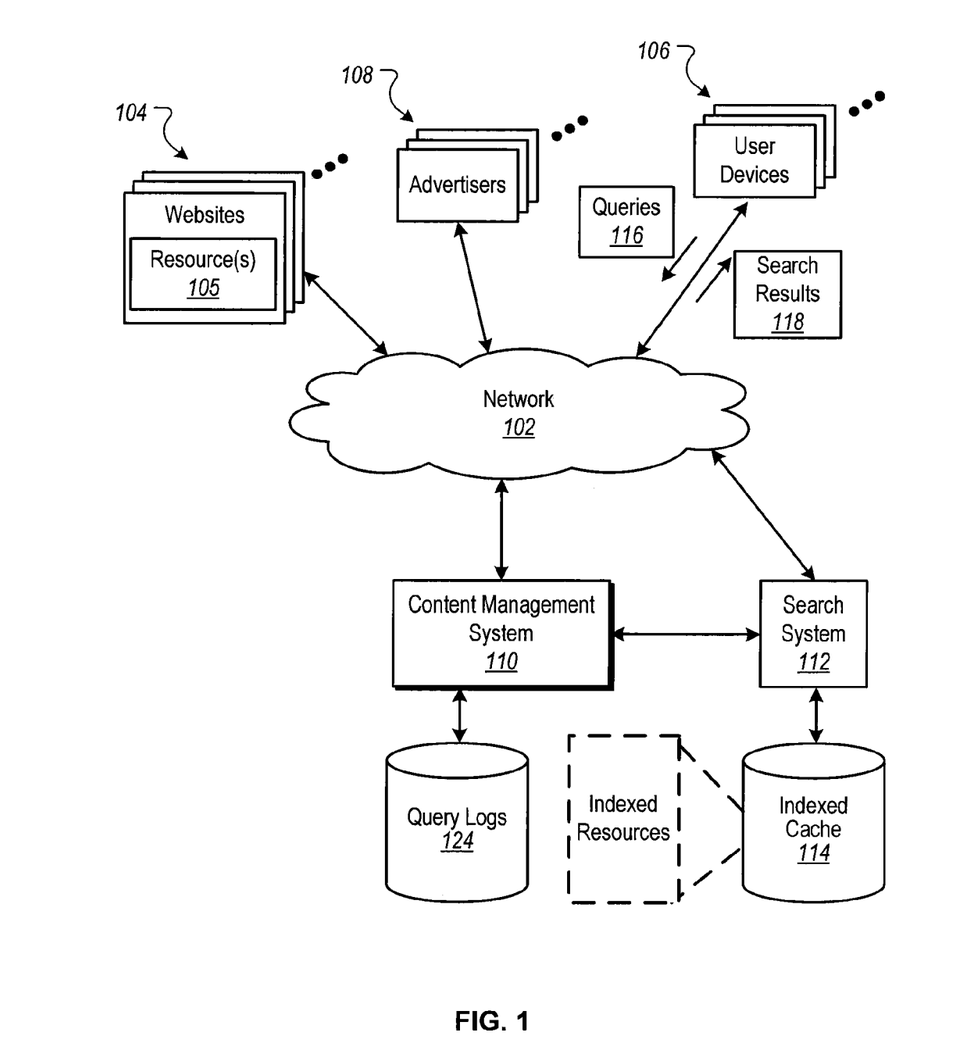
FIG. 1 is a block diagram of an example environment for ranking content using location-based query log analysis.

FIG. 1 is a block diagram of an example environment 100 for ranking content using location-based query log analysis.

The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content providers (e.g., advertisers 108), publishers, and the content management system 110. The example environment 100 may include many thousands of websites 104, user devices 106, and content sponsors (e.g., advertisers 108).

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented.

Query logs 124 can include information about past queries, including, for example, location-based queries and the corresponding query terms submitted. In some implementations, each entry in the query logs 124 includes query terms submitted and a region that is defined by a bounding region that was displayed in a viewport to the user prior to receipt of the query. In some implementations, each entry in the query logs 124 can also include additional information describing the region displayed in the viewport and one or more pushpin features associated with the region. In some implementations, a query log entry can include additional content, such as content that was delivered responsive to the query request.

When a resource 105 or search results 118 are requested by a user device 106, the content management system 110 receives a request for content to be provided with the resource 105 or search results 118. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, content items having targeting keywords that match the resource keywords or the search query 116 are selected as eligible content items by the content management system 110. In some implementations, content items can be business listings. In some implementations, the content management system 110 can determine a number of business listings in response to a request for content and associated with a region, evaluate query logs including using query terms to rank the business listings, and provide the business listings in response to the request for content.

A targeting keyword can match a resource keyword or a search query 116 by having the same textual content ("text") as the resource keyword or search query 116. For example, an ad associated with the targeting keyword "hotels" can be an eligible content item (or an eligible ad) for an ad request that includes the resource keyword "hotels." Similarly, the ad can be selected as an eligible content item for an ad request including the search query "hotels."

The content management system 110 can select from the eligible content items that are to be provided for presentation in slots of a resource or search results page based at least in part on results of an auction. For example, for the eligible content items, the content management system 110 can receive bids from content sponsors (e.g., advertisers) and allocate the slots, based at least in part on the received bids (e.g., based on the highest bidders at the conclusion of the auction). The bids are amounts that the content sponsors are willing to pay for presentation (or selection) of their content with a resource or search results page. For example, a bid can specify an amount that a content sponsor is willing to pay for each 1000 impressions (i.e., presentations) of the content item, referred to as a CPM bid. Alternatively, the bid can specify an amount that the content sponsor is willing to pay for a selection (i.e., a click-through) of the content item or a conversion following selection of the content item. The selected content item can be determined based on the bids alone, or based on the bids of each bidder being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by an advertiser to be any measurable/observable user action, such as downloading a white paper, navigating to at least a given depth of a website, viewing at least a certain number of web pages, spending at least a predetermined amount of time on a website or web page, registering on a website, experiencing media, or performing a social action regarding a content item (e.g., an ad), such as republishing or sharing the content item. Other actions that constitute a conversion can also be used. In some implementations, the likelihood that a conversion will occur can be improved, such as by serving content that is more likely to be of interest to the user. For example, if a content item that is served is selected in part based on the user's current location, then the user may be more likely to interact with the content item because it includes content that is relevant to user's current position, and may be associated with entities (e.g., restaurants, stores, etc.) that are in the user's immediate vicinity.

Figure 2:
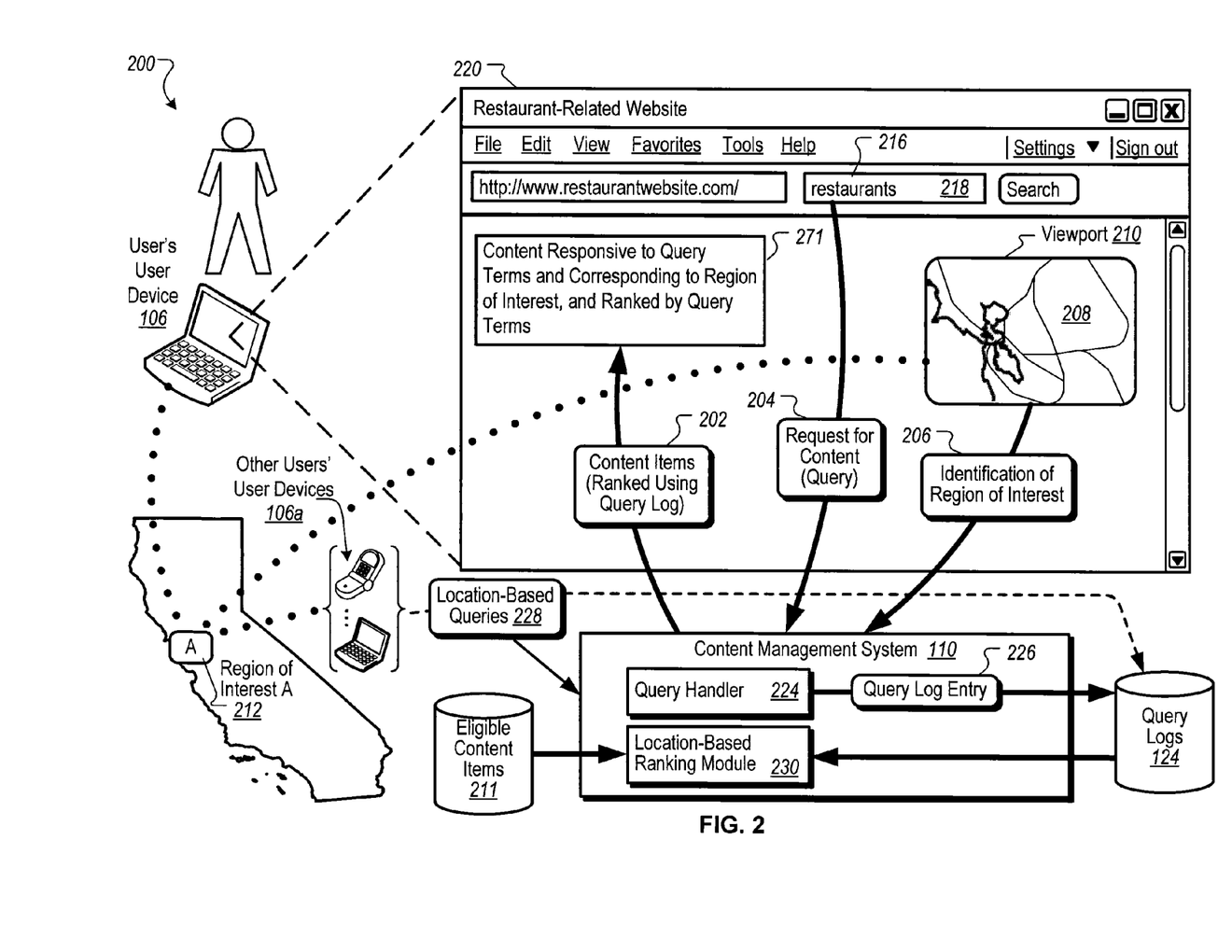
FIG. 2 is a block diagram showing an example system for ranking content using location-based query log analysis.

FIG. 2 is a block diagram showing an example system 200 for ranking content using location-based query log analysis. As an example, the content management system 110 can provide one or more content items 202 that are responsive to a request for content 204 (e.g., a search query for "restaurants"), as well as being based on an identified region of interest 206 (e.g., greater San Francisco). Content management system 110 can include plural engines, including a location engine, a local search engine (including a query handler 224 and a location-based ranking module 230 described below) and one or more local query logs. The location engine can be used to determine the location associated with the user, a location of interest or other location that is to be associated with a given query. In some implementations, the region of interest 206 can correspond to an area of interest for which a map 208 is displayed in a viewport 210. For example, the user can be viewing a map of the San Francisco area in a map application executing on the user's user device 106. The local search engine or, as described earlier with reference to FIG. 1, the search system 112 can identify resources from which can be identified a set of eligible content items 211 (e.g., business listings) that are responsive to the request for content 204. The content management system 110 (e.g., the local search engine) can rank the set of eligible content items 211 by evaluating previous queries associated with the region of interest 206. For example, the previous queries can be stored in the local query logs (e.g., the query logs 124), including queries for "restaurants" that other users submitted while viewing maps of greater San Francisco. As a result, the content items 202 that the content management system 110 provides are ranked content items that correspond to past queries submitted by users who were also viewing maps of region of interest 206.

In some implementations, evaluating query logs includes evaluating the business listings using the query terms from the query log to rank the business listings. Such ranking can be performed by the local search engine.

In some implementations, the content management system 110 can truncate the set of eligible content items 211 to include only the highest-ranked eligible content items 211, e.g., the eligible content items 211 having the highest query counts. In this way, the user can be provided with content that may be of higher interest and relevancy than content not resulting from location-based query log analysis. In some implementations, such as if the locations of the content items 202 are plotted on the map 208 (e.g., using push-pin markers), having a smaller number of content items 202 can prevent the user from being overwhelmed by large numbers of location markers.

In a more detailed example, a user who is at or near the location A 212 (e.g., the San Francisco area) can submit a search query 216 for "restaurants." For example, the user can enter the search query 216 in a search field 218 or some other field in a web browser that is executing on the user's user device 106. The user may enter the search query 216 to find nearby restaurants, for example, if the user is unfamiliar with the area. The search query 216 can be entered, for example, on a restaurant-related web page 220 or some other web page, such as a search page. In some implementations, other ways for generating the search query 216 or a similar query can exist, including the act by the user of using various controls (e.g., selecting options) to identify a subject of interest.

As a result of the user submitting the search query 216, the content management system 110, for example, can receive the request for content 204 from the user's user device 106. Further, the content management system 110 can receive or identify the region of interest 206. For example, a user who is using a map-related application on the user device 106 can have the map 208 of the San Francisco area displayed in the viewport 210. As a result, the region of interest 206 corresponding to the San Francisco area can also be provided to the content management system 110.

In some implementations, the region of interest 206 can be an area in which the user already resides, e.g., the user's present location. In some implementations, the region of interest 206 can correspond to a destination location that can be determined from query terms, driving directions in a map-related application that identify a starting point, or the coordinates of a viewport on the user's user device 106, to name a few examples. In some implementations, the region of interest 206 can identify a region to which the user is headed. For example, the map-related application can display a map of the San Francisco area based on the user's present location and direction-of-travel, e.g., if the user is heading toward San Francisco. In some implementations, the user's destination (and thus the map 208 to be displayed) can be determined by the one or more GPS locations or other geographic positional updates that are associated with the user's mobile user device 106. In some implementations, the region of interest 206 can be identified by a set of latitude and longitude coordinates that define the perimeter of a region. In some implementations, the region of interest 206 can be a circle defined by a radius extending from a latitude and longitude center point. In some implementations, the region of interest 206 can be identified by a region name, e.g., "Greater San Francisco," "Downtown San Francisco," or "San Francisco Marina/Pier," to name a few examples.

In response to the request for content 204, and using the region of interest 206, the content management system 110 can provide content items 202. In some implementations, the content management system 110 can use functionality of (or interface with) the search system 112 to identify resources from which to generate a set of eligible content items 211 that are responsive to the request for content 204. The content management system 110 can rank the eligible content items 211 based on past queries associated with the region of interest 206, e.g., using the query logs 124.

In some implementations, the content management system 110 includes the query handler 224. In some implementations, the query handler 224 can determine that a region of interest 206 is included when a request for content 204 is received. For example, the user can have a map-related application running when the search query 216 is submitted, and the displayed map 208 can correspond to the region of interest 206. When the query handler 224 determines that the request for content 204 is associated with a map-based query, for example, the query handler 224 can create a corresponding query log entry 226 for storage in the query logs 124. Over time, query log entries 226 that are created and stored by the content management system 110 can be represented by location-based queries 228. For example, the location-based queries 228, e.g., queries for "restaurants" associated with San Francisco, can originate from other users' user devices 106a, as well as the user device 106.

In some implementations, the content management system 110 invokes the location-based ranking module 230 when it is determined that a region of interest 206 is associated with a received request for content 204. Using the region of interest 206, for example, the location-based ranking module 230 can access the query logs 124 to determine all past submitted queries associated with the region of interest 206. For example, the past submitted queries can include the query (e.g., "restaurants") associated with the request for content 204. In some implementations, the location-based ranking module 230 can rank the content items 202 based on the query counts of the map-based queries for that location.

In some implementations, eligible content items 211 corresponding to the resources that the search system 112 identifies may not have associated map-based queries in the query logs 124. In some implementations, any such eligible content items 211 can be left unchanged by the location-based ranking module 230, e.g., not ranked higher or lower based on previous associated map-based queries. However, the location-based ranking module 230 can re-rank eligible content items 211 when they do have associated map-based queries in the query logs 124. In some implementations, the re-ranking can be accomplished by boosting the rank of the eligible content items 211 in proportion to the query counts for associated queries in the query logs 124.

Ways of determining the user's location, for example, can include determining a global positioning system (GPS) location of the user's user device 106. In this example, the location can include the latitude and longitude of the mobile device obtained using the GPS capabilities of the mobile device. In another example, the location of the user device 106 can be obtained through cell triangulation, e.g., from three or more signal transmitters, towers or satellites that serve the user's mobile device. In another example, the location of the user's mobile device can be obtained through periodic mobile check-ins, such as positional checkpoints made by the mobile device at regular intervals. In some implementations, if the user has a map displayed in a map application, for example, then the location can be obtained from the coordinates of the map's center-point (or other screen position), using the viewport of the device.

In some implementations, the location of the user device 106 can be determined in other ways. For example, the location can be determined based on the user device's connection to a mobile or wireless network, such as the Internet, e.g., using Wi-Fi signals. In another example, if the user of the user device 106 is on the Web using a map application, then the location of the user device 106 can be determined from driving directions that the user has requested and/or that have been provided by the map application. In some implementations, the driving directions can be parsed to locate and extract place names (e.g., business names, street names, city names, etc.) or other information for specific locations. Using a name obtained from the driving directions, for example, a reverse look-up can be performed to obtain an IP address that corresponds to the name (e.g., a business name, street name, etc.), and then the geographical location can be determined from the IP address.

Figure 3A:
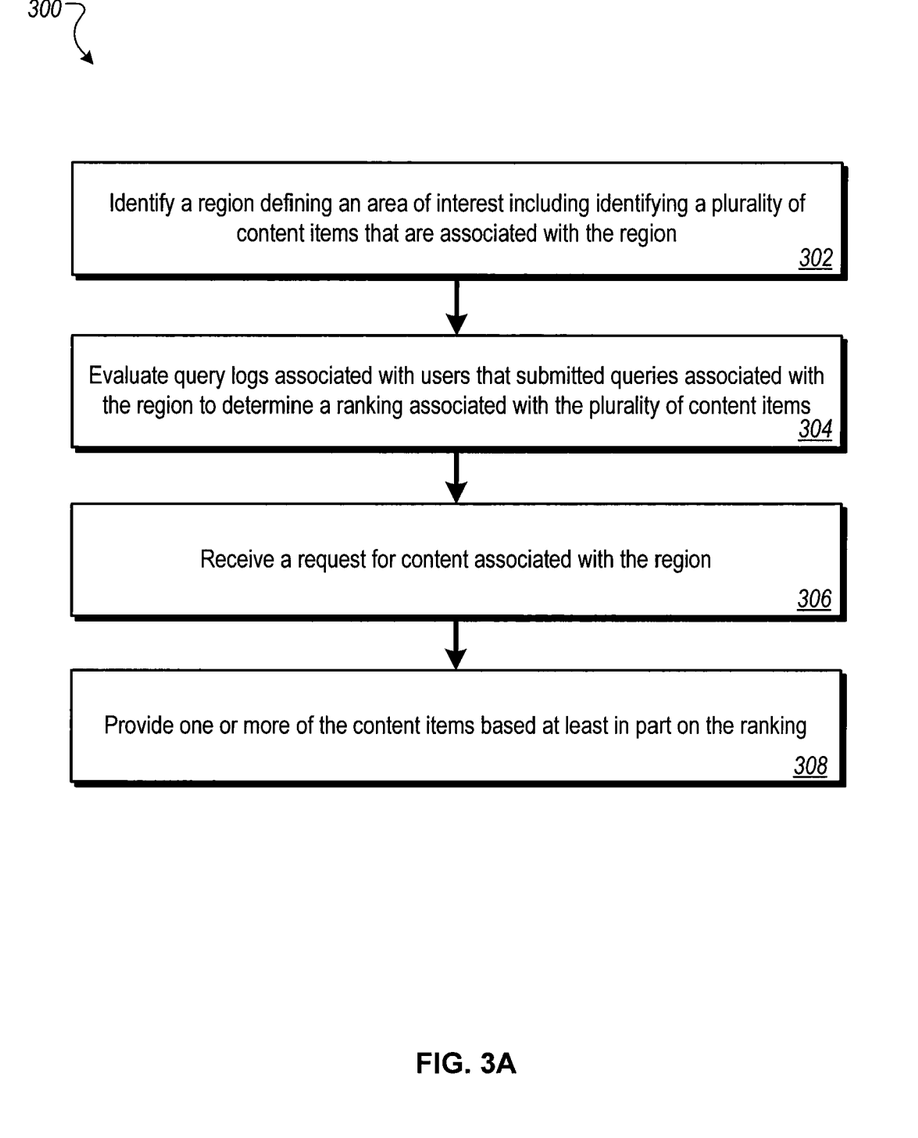
FIGS. 3A-3B are flowcharts of example processes for ranking content using location-based query log analysis.

FIG. 3A is a flowchart of an example process 300 for ranking content using location-based query log analysis. The process 300 can be performed, for example, by the content management system 110 including the query handler 224 and the location-based ranking module 230.

A region defining an area of interest is identified, including identifying a plurality of content items that are associated with the region (302). In some implementations, the content management system 110 (e.g., location engine) can identify various regions throughout the world, including place names, cities, states, ZIP codes, or other geographic features or identifiers. For example, at least one region can correspond to the region of interest 206 corresponding to the greater San Francisco area. In some implementations, regions can overlap and/or can be based on smaller regions, such as using quad cells or some other hierarchical representation of regions. In some implementations, the content management system 110 can associate content items with regions based on the location of the entity (e.g., restaurant, store, etc.) associated with each content item. For example, a content item corresponding to a San Francisco area restaurant can be associated with the San Francisco region. Many other content items of other entities can be associated with the San Francisco region.

Query logs associated with users that submitted queries associated with the region are evaluated to determine a ranking associated with the plurality of content items (304). For example, on an ongoing basis, or on demand, the content management system 110 can access the query logs 124 and evaluate past queries submitted by users for query terms associated with each region. One purpose of accessing the query logs 124 is to facilitate ranking of eligible content items (e.g., eligible ads) based on past query terms that have occurred in association with a given region. In some implementations, the content management system 110 can determine the number of queries submitted by users for each region. In some implementations, ranking content items can be based on the number of queries that have been received by users in that region (e.g., content items can be compared to determine if they satisfy queries that were most often provided and the items can be ranked based on whether they satisfy/match the prior queries). For example, a highest-ranked content item for the San Francisco region may be the content item associated with Nosky's Noodles, a restaurant in downtown San Francisco. In some implementations, the highest rank can be assigned because that particular content item associated with that entity is a match for one or more (or a greatest number of) prior map-based queries in a query log for that particular region, e.g., based on queries received from users viewing San Francisco in a map-related application viewport. In some implementations, a time element can be used, e.g., to raise the rank of a content item if it matches queries that occurred more recently on average than other queries, and/or to lower the rank if the queries are generally older than average. While reference is made to ranking content items, such ranking may not occur until after a request for content is received.

A request for content associated with the region is received (306). As an example, referring to FIG. 2, the content management system 110 can receive the request for content 204 (e.g., a search query for "restaurants") and an identified region of interest 206. The region of interest 206, for example, can identify the greater San Francisco area as the region that the user currently has displayed in the viewport of a map-related application.

Responsive to the request, one or more eligible content items are identified and ranked. For example, the content management system 110 can rank eligible content items based on the query logs.

One or more of the content items are provided that are based at least in part on the ranking (308). For example, the search system 112 can identify resources from which eligible content items can be identified that are relevant to the request for content 204, e.g., resulting from the search query 216 for "restaurants." In some implementations, the content management system 110 can rank the eligible content items based on the ranking that resulted from evaluating map-based query information in the query logs 124. In some implementations, the content management system 110 can truncate the eligible content items, e.g., by omitting lower-ranked content items. Upon completion of ranking the content items, and optionally truncating the content items, the content management system 110 can provide the content items to the requestor, e.g., the user device 106.

Figure 3B:
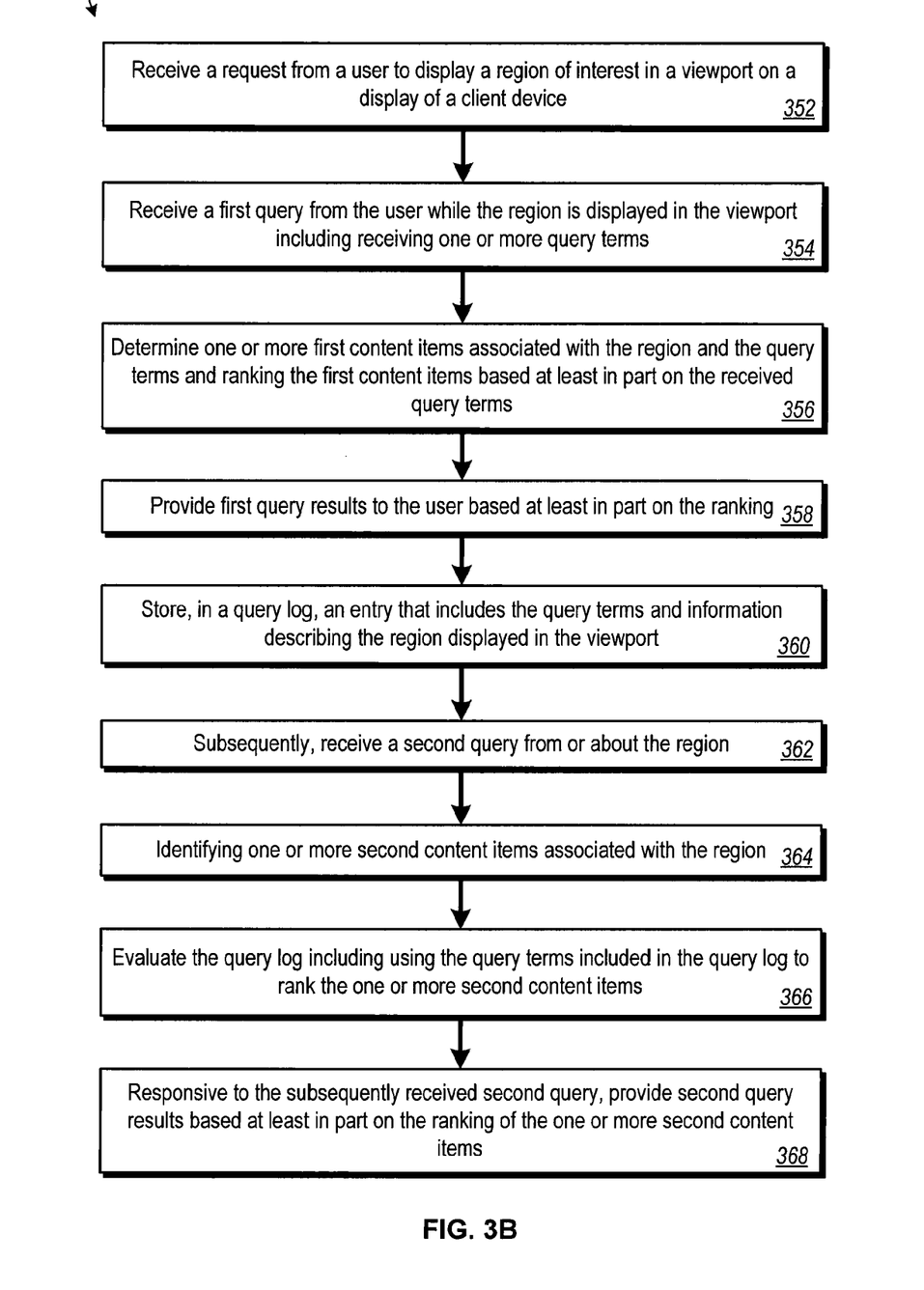

FIG. 3B is a flowchart of another example process 350 for ranking content using location-based query log analysis. The process 350 can be performed, for example, by the content management system 110 and the search system 112. In some implementations, the content management system 110 can use the process 350 to determine a number of business listings in response to a request for content and associated with a region, evaluate query logs including using query terms to rank the business listings, and provide the business listings in response to the request for content.

A request is received from a user to display a region of interest in a viewport on a display of a client device (352). For example, if the user is using a map-related application on the user device 106, then the request to display a region can occur when the user specifies a destination, e.g., by typing in the name of a city (e.g., San Francisco), a state, a business, or any geographically-locatable entity. In some implementations, the request to display a region can occur when the user navigates from a currently-displayed region to a new region. For example, if the user is displaying an area east of the San Francisco area and pans the display to the west, then the request to display a region of interest can be for the San Francisco area.

A first query is received from the user while the region is displayed in the viewport, including receiving one or more query terms (354). For example, the user can enter the search query 216 for "restaurants" in the search field 218. In some implementations, the content management system 110 can receive the query.

One or more first content items are determined that are associated with the region and the query terms, and the first content items are ranked based at least in part on the received query terms (356). In some implementations, the search system 112 can identify resources from which eligible content items are identified that are relevant to the request for content 204, e.g., resulting from the search query 216 for "restaurants." In some implementations, the content management system 110 can rank the content items by evaluating map-based queries in the query logs 124.

First query results are provided to the user, and the first query results are based at least in part on the ranking (358). For example, the content management system 110 can provide the content items 202, and the content items 202 can be ranked based on the ranking performed by evaluating queries in the query logs 124.

An entry is stored in a query log that includes the query terms and information describing the region displayed in the viewport along with other information (e.g., the content items that were delivered responsive to the query) (360). In some implementations, the content management system 110 can update the query logs 124 based on queries associated with the request for content 204 and the identified region of interest 206 that were received. For example, the request for content 204 can identify the query terms (e.g., "restaurants") that were part of the search query 216 entered by the user. The identified region of interest 206, for example, can be the greater San Francisco area that the user currently has displayed in the viewport of a map-related application. Using the information from the request for content 204 and the identified region of interest 206, for example, the content management system 110 can build an entry and store the entry in the query logs 124. In some implementations, the content management system 110 can also store pushpin features that are associated with content items 202. For example, if the content items 202 include a content item for Nosky's Noodles and information for a corresponding pushpin feature that can be displayed in the viewport of the user's map-related application, then the information for Nosky's Noodles pushpin feature can be included with the entry stored in the query logs 124.

Over time, the same sequence of events can occur for other requests and queries that the content management system 110 receives. For example, the query terms for each query and the region information can be used by the content management system 110 to build additional entries and store the additional entries in the query logs 124, as represented by the location-based queries 228 shown in FIG. 2.

A second query from or about the region is subsequently received (362). For example, the same or a different user can submit a query, such as for "restaurants," while displaying the San Francisco region in the viewport of a map-related application. In some implementations, the user can be physically at a location within the region, or the user can be in another location outside the region while displaying the region in the viewport. In some implementations, the query and the situation that it is from or about the region can be received by the content management system 110 in the form of the request for content 204 and the identified region of interest 206.

One or more second content items are identified that are associated with the region (364). For example, the content management system 110 can identify content items that are associated with the identified region of interest 206. In some implementations, the content management system 110 can associate content items with the region after the search system 112 identifies resources from which eligible content items can be identified that are relevant to the request for content 204, e.g., resulting from the search query 216 for "restaurants."

The query log is evaluated including using the query terms included in the query log to rank the one or more second content items (366). For example, the content management system 110 can evaluate queries in the query logs 124. The evaluated queries in this example are the queries that were submitted previously by users and associated with the identified region of interest 206 and with the same content items as the one or more second content items.

In response to the subsequently received second query, second query results are provided that are based at least in part on the ranking of the one or more second content items (368). For example, the content management system 110 can provide content items 202 that include the second query results that are responsive to the request for content 204 (e.g., resulting from the search query 216 for "restaurants"). In some implementations, the content management system 110 can rank the content items 202 based on evaluating map-based queries in the query logs 124 for the same region and associated content items. In some implementations, the content management system 110 can truncate the content items, e.g., by omitting lower-ranked content items. Upon completion of ranking the content items, and optionally truncating the content items, the content management system 110 can provide the content items to the requestor, e.g., the user device 106.

In some implementations, other processes can be used for ranking content using location-based query log analysis. One such process can start by identifying a region defining an area of interest, including identifying a plurality of queries that are associated with the region. The queries identified are the queries previously received and processed for delivery of content items to users in (or who have expressed an interest in) the region. For example, the region of interest 206 can be San Francisco (e.g., identified in a query or inferred from a user's current location), and the location-based ranking module 230 can access the query logs 124 to determine all past submitted queries associated with the region of interest 206 (e.g., San Francisco). Query logs associated with users that submitted the queries associated with the region are evaluated to determine a ranking associated with the queries. For example, the location-based ranking module 230 can rank the queries based on the query counts of the map-based queries for that location. A request for content associated with the region is received. As an example, referring to FIG. 2, the content management system 110 can receive the request for content 204 (e.g., a search query for "restaurants") and an identified region of interest 206 (e.g., San Francisco). One or more content items responsive to the request are identified. For example, the search system 112 can identify resources from which eligible content items can be identified that are relevant to the request for content 204, e.g., resulting from the search query 216 for "restaurants." The identified one or more content items are ranked based at least in part on the ranking associated with the queries. For example, the location-based ranking module 230 can rank the content items based on the ranking of the map-based queries for that location. One or more of the content items are provided based at least in part on the ranking. For example, the content management system 110 can provide the content items 202.

Figure 4:
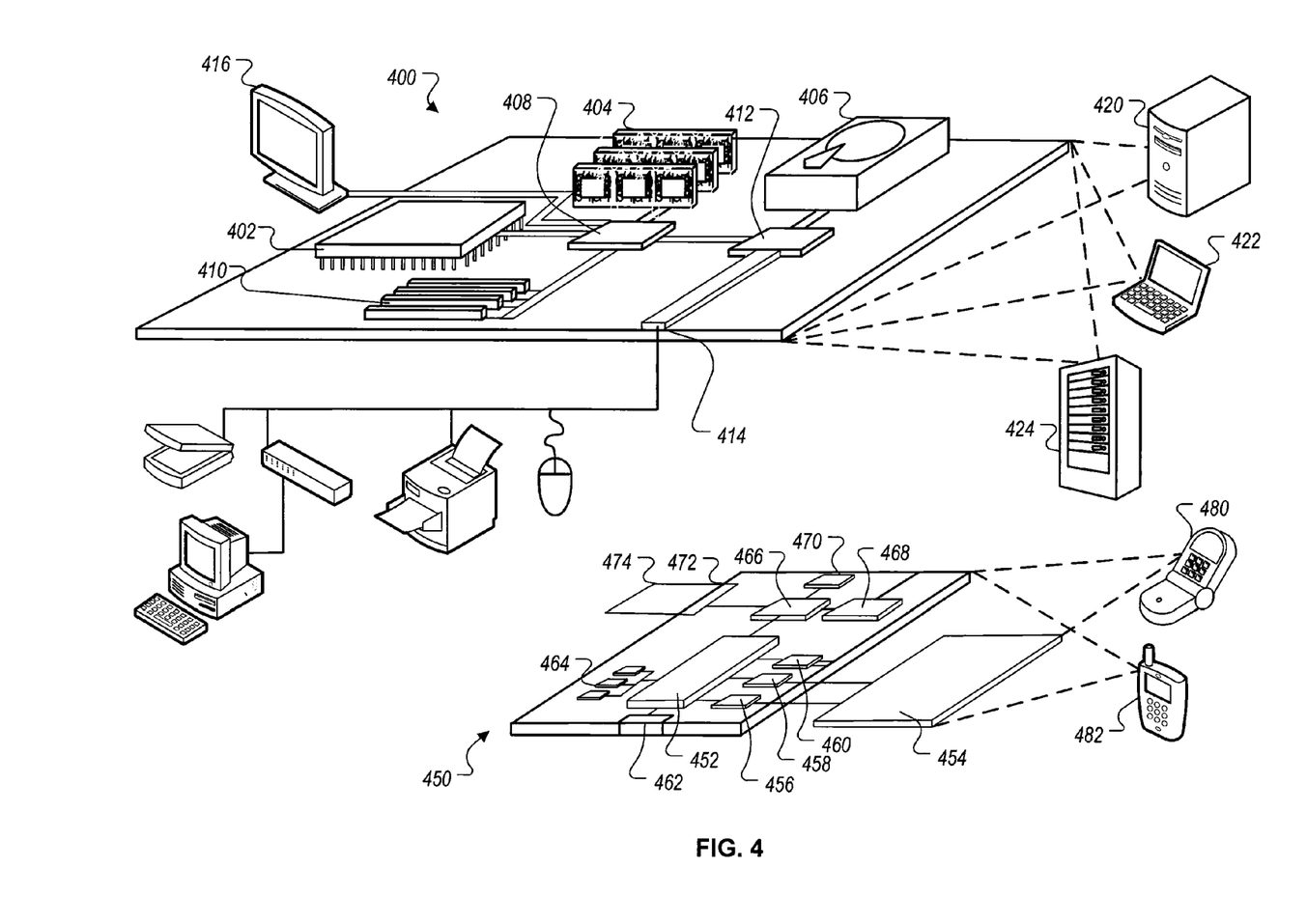
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for providing ranked content to a user according to a location-based query log analysis, the method comprising:

receiving, at one or more processors in a client device via a user interface, a selection of a viewport defining an area of interest corresponding to a region;

receiving, at the one or more processors via the user interface, a geographic search query associated with the region;

determining, by the one or more processors, a plurality of content items in response to the geographic search query and ranking each of the plurality of content items;

truncating, by the one or more processors, at least one of the plurality of content items which is ranked below a predetermined threshold ranking, wherein a number of content items ranked above the predetermined threshold ranking is based on a size of the viewport to reduce an amount of information displayed on the viewport; and displaying, by the one or more processors on the user interface, the viewport annotated with indications of a smaller number of content items than the plurality of content items in accordance with the predetermined threshold ranking.

2. The method of claim 1, wherein determining a plurality of content items in response to the geographic search query includes:

transmitting, by the one or more processors, the area of interest corresponding to the region and the geographic search query associated with the region to a content management system; and receiving, at the one or more processors, the plurality of content items from the content management system based on the area of interest and the geographic search query.

3. The method of claim 2, wherein the ranking associated with each of the content items is determined based on the content management system evaluating query logs associated with users that submitted queries associated with the region, wherein each content item is ranked based on a number of queries in the query logs for which each content item is responsive.

4. The method of claim 3, wherein each content item is further ranked based on a time of occurrence of the number of queries, wherein each content item is ranked higher if the number of queries occurred more recently on average than other queries in the query logs and ranked lower if the number of queries occurred less recently on average than other queries in the query logs.

5. The method of claim 2, wherein the transmitted region and geographic search query are associated and stored as an entry in the query logs of the content management system.

6. The method of claim 1, wherein the plurality of content items include a predetermined threshold number of content items according to a size of the viewport.

7. The method of claim 1, wherein the ranking associated with each of the content items is determined based on a content management system evaluating query logs associated with users that submitted queries associated with the region, and wherein each content item is ranked based on a time of occurrence of a number of queries in the query logs for which each content item is responsive.

8. A user device comprising:
   a user interface;
   one or more processors communicatively coupled to the user interface;
   a non-transitory computer readable memory communicatively coupled to the one or more processors and storing thereon instructions that, when executed by the one or more processors, cause the user device to:
      obtain a selection of a viewport displayed on the user interface, wherein the viewport defines an area of interest corresponding to a region,
      obtain, via the user interface, a geographic search query associated with the region,
      determine a plurality of content items in response to the geographic search query and rank each of the plurality of content items,
      truncate at least one of the plurality of content items which is ranked below a predetermined threshold ranking, wherein a number of content items ranked above the predetermined threshold ranking is based on a size of the viewport to reduce an amount of information displayed on the viewport, and
      display, on the user interface, the viewport annotated with indications of a smaller number of content items than the plurality of content items in accordance with the predetermined threshold ranking.

9. The user device of claim 8, wherein to determine a plurality of content items in response to the geographic search query, the instructions cause the user device to:
   transmit, via a communication network, the area of interest corresponding to the region and the geographic search query associated with the region to a content management system; and
   receive, via the communication network, the plurality of content items from the content management system based on the area of interest and the geographic search query.

10. The user device of claim 9, wherein the ranking associated with each of the content items is determined based on the content management system evaluating query logs associated with users that submitted queries associated with the region, wherein each content item is ranked based on a number of queries in the query logs for which each content item is responsive.

11. The user device of claim 10, wherein each content item is further ranked based on a time of occurrence of the number of queries, wherein each content item is ranked higher if the number of queries occurred more recently on average than other queries in the query logs and ranked lower if the number of queries occurred less recently on average than other queries in the query logs.

12. The user device of claim 9, wherein the transmitted region and geographic search query are associated and stored as an entry in the query logs of the content management system.

13. A computer-implemented method for providing ranked content to a user according to a location-based query log analysis, the method comprising:
   receiving, at one or more processors in a client device via a user interface, a selection of a viewport defining an area of interest corresponding to a region;
   receiving, at the one or more processors via the user interface, a first geographic search query associated with the region;
   displaying, by the one or more processors on the user interface, a plurality of first content items in response to the first geographic search query and ranking each of the plurality of first content items;
   truncating, by the one or more processors, at least one of the plurality of first content items which is ranked below a predetermined threshold ranking, wherein a number of first content items ranked above the predetermined threshold ranking is based on the size of the viewport to reduce an amount of information displayed on the viewport;
   receiving, at the one or more processors via the user interface, a second geographic search query associated with the region; and
   displaying, by the one or more processors on the user interface, a plurality of second content items in response to the second geographic search query based on a ranking associated with each of the second content items, wherein each of the plurality of second content items are ranked above the predetermined threshold ranking.

14. The method of claim 13, wherein the first geographic search query is received at a first time, the second geographic search query is received at a second time, the first and second geographic search queries contain identical query terms; and
   wherein the plurality of second content items include one or more different content items than the plurality of first content items.

15. The method of claim 14, wherein displaying a plurality of first content items in response to the first geographic search query includes:
   transmitting, by the one or more processors, the area of interest corresponding to the region and the first geographic search query associated with the region to a content management system; and
   receiving, at the one or more processors, the plurality of first content items from the content management system.

16. The method of claim 15, wherein the ranking associated with each of the first content items is determined based on the content management system evaluating query logs associated with users that submitted queries associated with the region, wherein each first content item is ranked based on a number of queries in the query logs for which each first content item is responsive.

17. The method of claim 16, wherein the ranking associated with each of the second content items is determined based on the content management system evaluating updated query logs at the second time.

18. The method of claim 16, wherein the transmitted region and the first geographic search query are associated and stored as an entry in the query logs of the content management system.

* * * * *